Sept. 17, 1929.  F. F. FORSHEE  1,728,751
SANDWICH TOASTER
Filed July 21, 1928   2 Sheets-Sheet 1

INVENTOR
Frank F. Forshee
BY
ATTORNEY

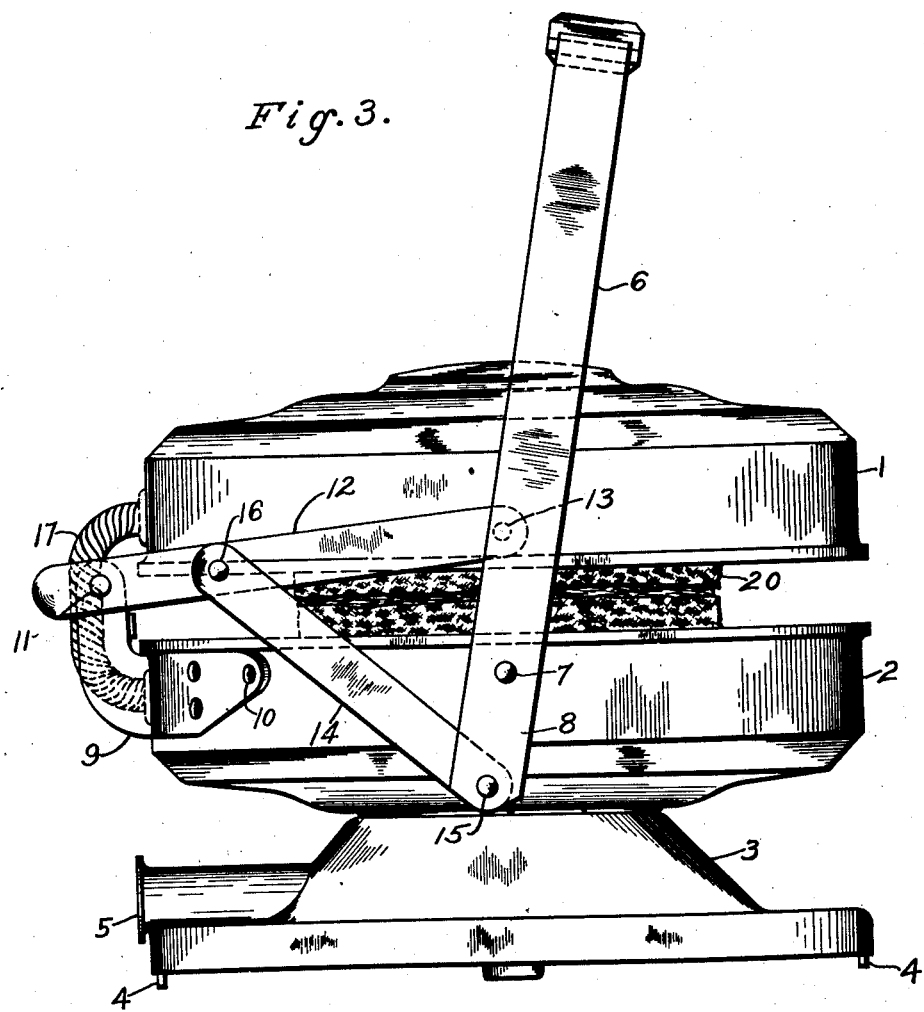

Patented Sept. 17, 1929

1,728,751

UNITED STATES PATENT OFFICE

FRANK F. BORSHEE, OF MANSFIELD, OHIO, ASSIGNOR TO WESTINGHOUSE ELECTRIC & MANUFACTURING COMPANY, A CORPORATION OF PENNSYLVANIA

SANDWICH TOASTER

Application filed July 21, 1928. Serial No. 294,394.

My invention relates to electrically heated apparatus and more particularly to electrically heated sandwich toasters and it has for an object the provision of a single means which, in one position, serves as a carrying member and operable, when rotated to another position, to move one of the toaster members from a horizontal position to a position spaced from, and at an angle to, the other member.

Another object is to provide a conducting member to electrically connect the upper and lower members of the toaster, said conducting member cooperating with the toaster-opening means to yieldingly hold down one side of the movable toaster member, thereby causing said member to assume a position at an angle to the horizontal.

Another object is to provide a sandwich toaster which is neat in appearance, simple in operation and so designed as to adapt itself to sandwiches of varying thicknesses or irregular shapes.

Figure 1:
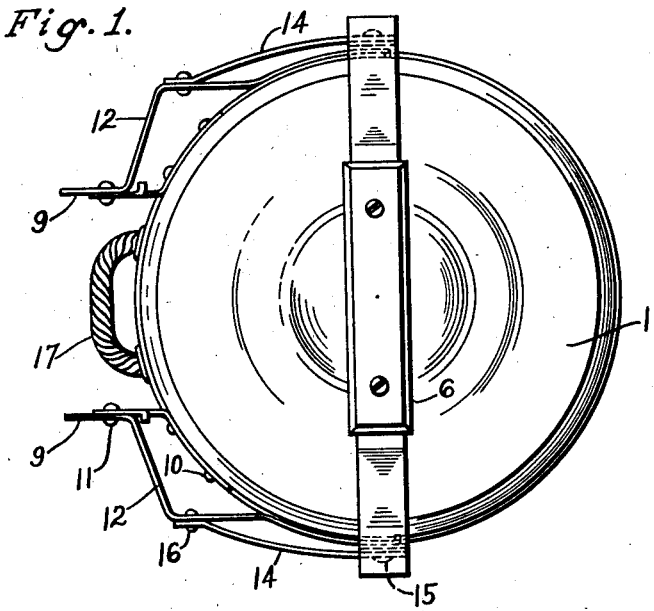
Figure 2:
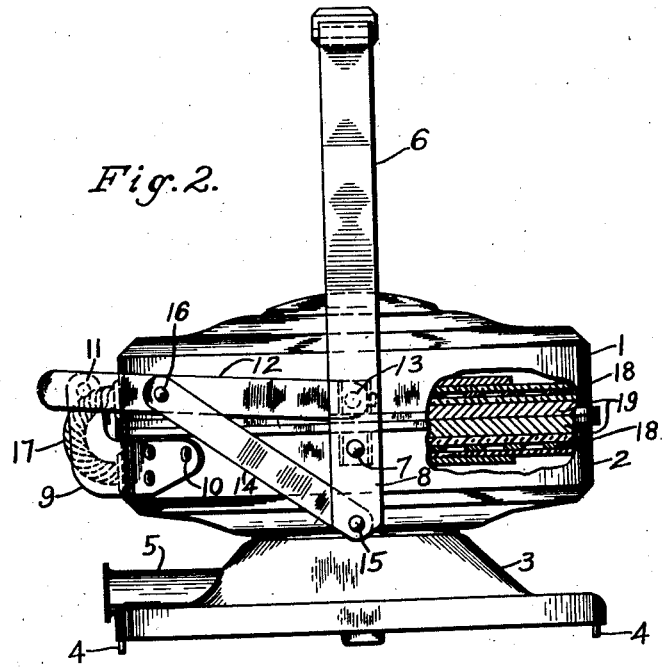

Other objects will appear as the specification and claims are read with reference to the accompanying drawings, in which Figure 1 is a top plan view of a device embodying my invention, Fig. 2 is a view, in side elevation, of a preferred form of my invention, portions being broken away and in section; and Fig. 3 is a view, also in side elevation, showing the toaster with its parts in operative positions and a sandwich engaged by the heated members.

Numerals 1 and 2 indicate, respectively, upper and lower electrically heated members which are mounted upon a base 3. Base 3 is provided with legs 4 and terminal socket 5. A handle 6 of inverted U shape is pivotally attached to member 2 by means of pivots 7, its ends 8 projecting beyond the pivots.

Brackets 9 are rigidly fastened to one side of the member 2 to serve as supports for links 12 which are pivotally connected thereto by pivots 11 and to diametrically opposite points of member 1 by pivots 13.

Means for operating links 12 to raise member 1 comprise links 14 pivotally connected to links 12, by means of pivots 16, and to the lower ends of handle extensions 8 by means of pivots 15.

A flexible armored conductor 17 electrically connects the heating elements 18 respectively located within the casings 1 and 2. Plates 19, to be heated by elements 18, are provided to receive a sandwich between them.

It will be apparent that a rotative clockwise movement of the upper end of handle 6 (as shown in the drawings) will move links 14 bodily in a direction substantially in the line of pivots 15—16 which, in turn, causes a counter-clockwise rotative movement of links 12 about pivots 11. The pivots 13 will move counter-clockwise in an arcuate path, with pivots 11 as an axis. Since casing 1 is pivoted at midpoints 13, it will tend to rise vertically and remain parallel to casing 2. The conductor 17, however, acts to yieldingly hold down the rear end of casing 1, whereby the casing is tilted counter-clockwise about pivots 13 to provide for a maximum separation between its front end and the corresponding end of casing 2.

In the operation of the device, handle 6 is moved clockwise, as explained above, to move casing 1 to its open or raised position. After a sandwich is placed in position on lower plate 19 and the handle 6 is then returned to its former upright position, the upper casing 1 will assume the position shown in Fig. 3 to effect complete engagement of the face of the upper plate 19 with the upper face of the sandwich.

Flexible conductor 17 will permit the rear end of casing 1 to rise sufficiently to accommodate sandwiches of different thicknesses.

It is apparent that the adaptability of casing 1 to turn upon pivots 13 will permit the upper plate 19 to assume a position in full engagement with the upper face of any sandwich, the front and rear edges of which differ in thickness.

Modifications in structural details are to be understood as within the scope of my invention if not found in the prior art or not excluded by the terms of the appended claims.

What I claim is:

1. In an electrically heated sandwich toaster, upper and lower casings, pivotal means including a pair of links connecting said casings for permitting said casings to assume substantially parallel-spaced positions in contact with a sandwich, a handle of inverted U-shape pivoted to said lower casing for carrying said casings, and means pivoted to said handle and to the links of said pivotal means for separating said casings.

2. In an electrically heated sandwich toaster, upper and lower casings, pivotal means connecting said casings for permitting said casings to assume parallel spaced positions in contact with a sandwich, said means including a pair of links having their ends pivotally connected to said casings, a handle pivoted to said lower casing for carrying said casings, and a second pair of links pivotally connected to said handle and to said first named links, intermediate the ends thereof.

3. In an electrically heated sandwich toaster, upper and lower casings, pivotal means connecting said casings for permitting said casings to assume substantially parallel-spaced positions in contact with a sandwich, said means including a pair of links pivotally connected at their respective ends to said casings, a handle of inverted U-shape pivoted to said lower casing for carrying said casings, and a pair of links pivotally connected at their ends to said handle and to said first named links intermediate the ends thereof, electrical heating means in said casings and means electrically connecting said heating means.

4. In an electrically heated apparatus, in combination, two superposed electrically heated members, means connecting said members permitting one member to move vertically with respect to the other member, and yielding means connecting said members to limit the extent of said vertical movement and to thereafter act to cause a pivotal relative movement between said members.

5. In an electrically heated sandwich toaster having upper and lower casings, a pair of brackets on the lower casing, a pair of links each having one end pivotally connected to a bracket and the other end pivotally connected to the upper casing, a handle of inverted U-shape pivotally connected to the lower casing adjacent to the ends of the handle and a second pair of links each pivotally connected at one end to one of the first named links intermediate its ends and at its other end to one end of the handle.

In testimony whereof, I have hereunto subscribed my name this 13th day of July, 1928.

FRANK F. FORSHEE.